Aug. 10, 1965    J. W. SEAMAN    3,199,621
SELF-PROPELLING POWER UNIT FOR GOLF BAG CART
Filed Jan. 25, 1962    3 Sheets-Sheet 1
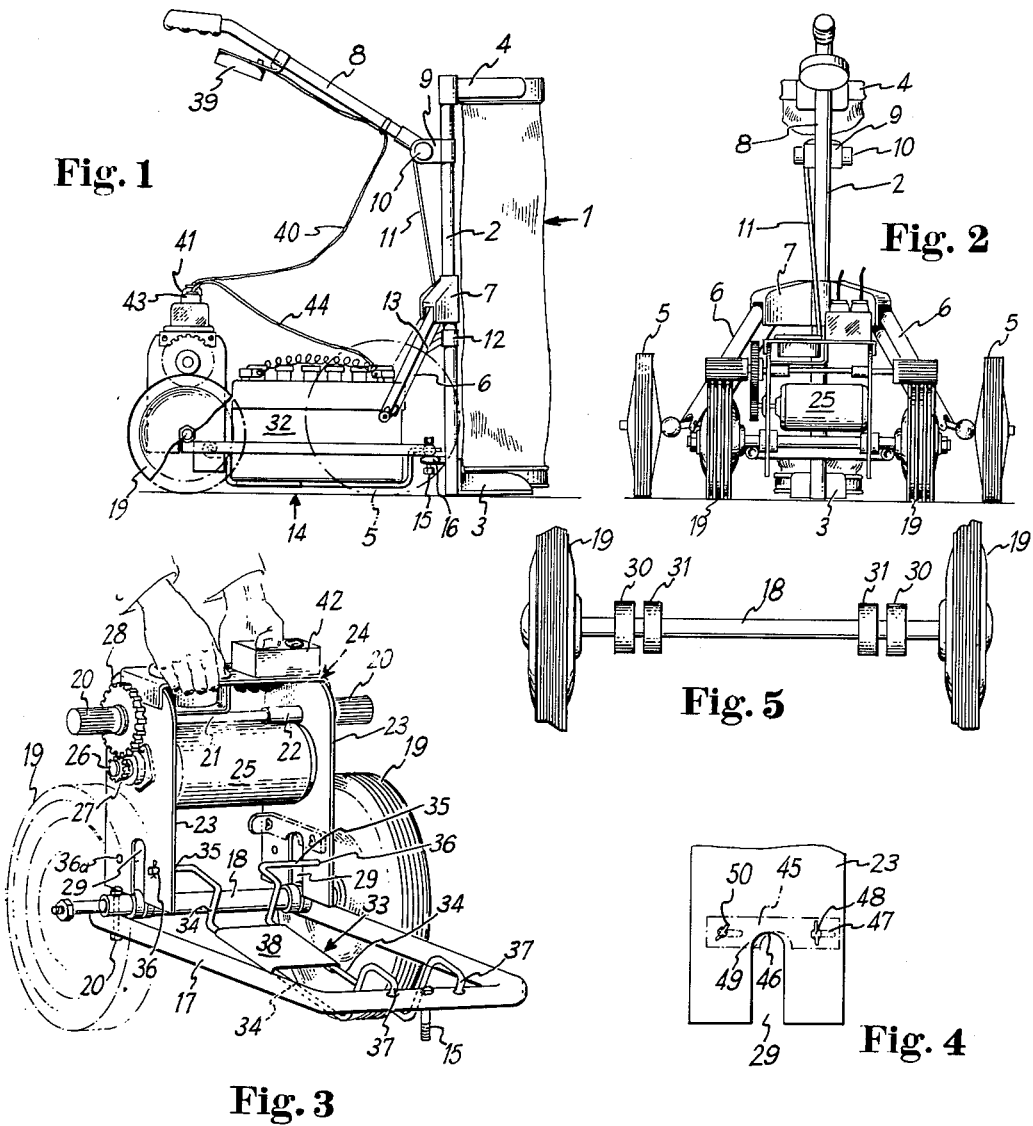
INVENTOR.
JOSEPH W. SEAMAN,
BY
Yungblut, Melville, Strasser & Foster
ATTORNEYS.

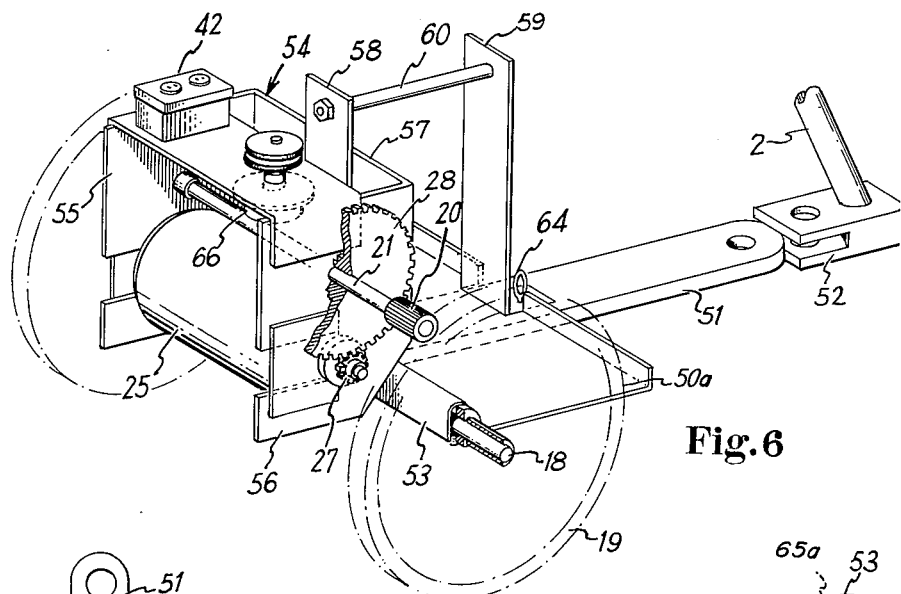
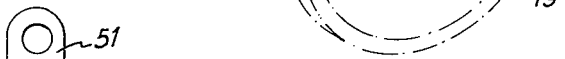
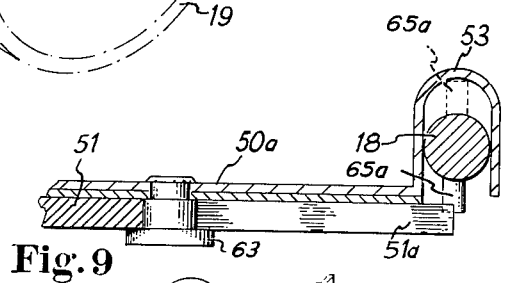
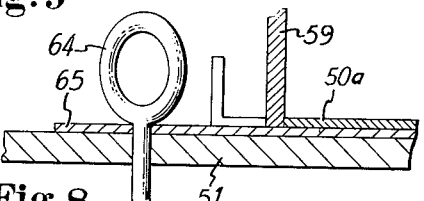
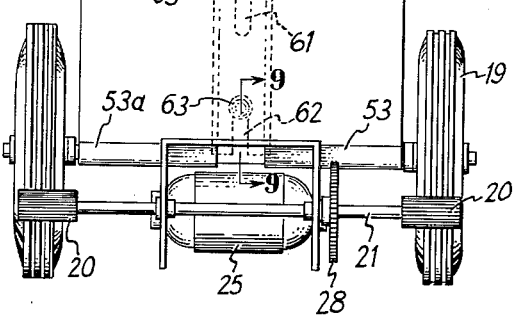
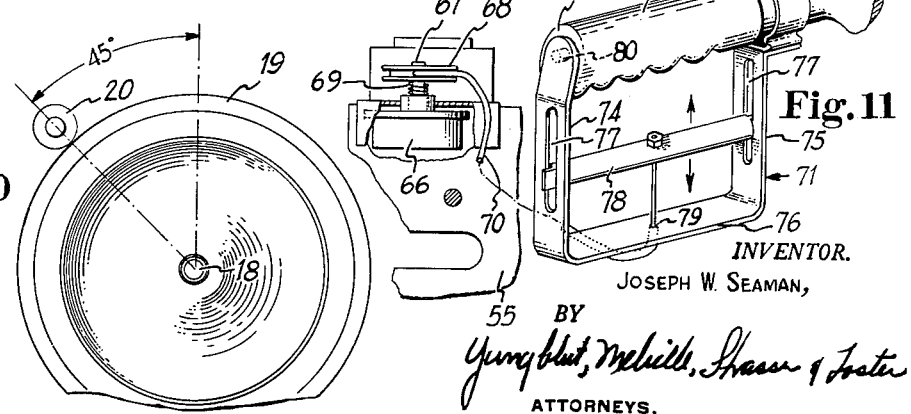
INVENTOR.
JOSEPH W. SEAMAN,
ATTORNEYS.

INVENTOR.
JOSEPH W. SEAMAN,
BY

ATTORNEYS.

3,199,621
SELF-PROPELLING POWER UNIT FOR
GOLF BAG CART
Joseph W. Seaman, Cincinnati, Ohio, assignor to Seaman
Enterprises, Inc., Cincinnati, Ohio, a corporation of
Ohio
Filed Jan. 25, 1962, Ser. No. 168,743
10 Claims. (Cl. 180—11)

This invention relates to golf carts, and relates more particularly to a power unit which may be used in conjunction with conventional two-wheel golf bag carts of the type now employed to carry golf bags.

Generally speaking, the conventional golf bag cart comprises a frame structure which may or may not be collapsible, the frame structure usually mounting a pair of spaced apart wheels and a projecting handle by means of which the golfer manually propels the cart over the golf course. Most golfers prefer to pull the cart in back of them as they walk, in which event the forwardly extending handle is used to lead and steer the cart. Others prefer to push the cart in front of them, using the handle both to push and steer the cart. In either event, considerable manual effort is required. While various forms of power driven golf bag carts have hitherto been proposed, the great bulk of such self-propelled carts have been exceedingly cumbersome and difficult to handle. For the most part they are uncapable of being collapsed and it is virtually impossible to lift them in and out of an automobile trunk, particularly where the user is a woman. In addition, the cost of such carts is far beyond the means of the average golfer.

Accordingly, a principal object of the instant invention is the provision of a motor driven power unit designed to be easily attached to a conventional folding golf bag cart so that the golfer may readily convert his present manually propelled cart to a self-propelled unit while maintaining the portable character of the entire assembly.

A further object of the instant invention is to provide a power unit which is uniquely designed to convert a conventional manually propelled cart into a power driven cart at a cost substantially below those now available.

A further object of the instant invention is the provision of a power unit which may be readily detached from the conventional golf bag cart and which, in itself, may be readily disassembled into major components which may be easily handled by a woman or child.

Still a further object of the instant invention is the provision of a power unit in which the weight of the battery and motor are utilized to maintain the driving rollers of the unit in frictional contact with the traction wheels.

Still a further object of the instant invention is the provision in certain embodiments of the invention of a motor mount or housing by means of which the drive motor is detachably secured to and supported by the traction wheel axle, the arrangement of parts being such that the motor and its support may be readily detached from the remainder of the power unit. Coupled with this objective, in one embodiment of the invention, the motor mount is arranged to be reversed relative to the traction wheels, whereby a non-reversing motor may be utilized to drive the unit in either direction, depending upon whether the user wishes the cart to trail in back of him or travel ahead.

Yet a further object of the invention is the provision of a power unit which has a single point attachment to the conventional golf bag cart, the arrangement of parts being such as to permit the traction wheels of the drive unit to follow the contour of the ground independently of the cart itself.

The foregoing together with other objects of the instant invention which will appear hereinafter or which will be apparent to the skilled worker in the art upon reading this specification, I accomplish by those constructions and arrangements of parts of which I shall now describe certain exemplary embodiments.

Reference is now made to the accompanying drawings wherein:

FIGURE 1 is a side elevational view of a conventional collapsible golf cart equipped with the power unit of the instant invention.

FIGURE 2 is a side elevational view taken from the left side of FIGURE 1.

FIGURE 3 is a perspective view with parts in phantom of the power unit illustrating the manner in which the motor housing is received by the axle of the traction wheels.

FIGURE 4 is an enlarged fragmentary side elevational view of the motor housing, illustrating a cam member by means of which the housing may be elevated relative to the axle.

FIGURE 5 is an enlarged side elevational view illustrating the traction wheels, their axle, and the collars which receive the opposite sides of the motor housing.

FIGURE 6 is a perspective view with parts broken away of another embodiment of the invention.

FIGURE 7 is a plan view of the device of FIGURE 6.

FIGURE 8 is an enlarged fragmentary sectional view taken along the line 8—8 of FIGURE 7.

FIGURE 9 is an enlarged fragmentary sectional view taken along the line 9—9 of FIGURE 7.

FIGURE 10 is a diagrammatic elevational view illustrating the preferred displacement of the drive rollers relative to the traction wheels.

FIGURE 11 is a diagrammatic view illustrating an alternate form of rheostat control for the drive unit.

Figure 12:
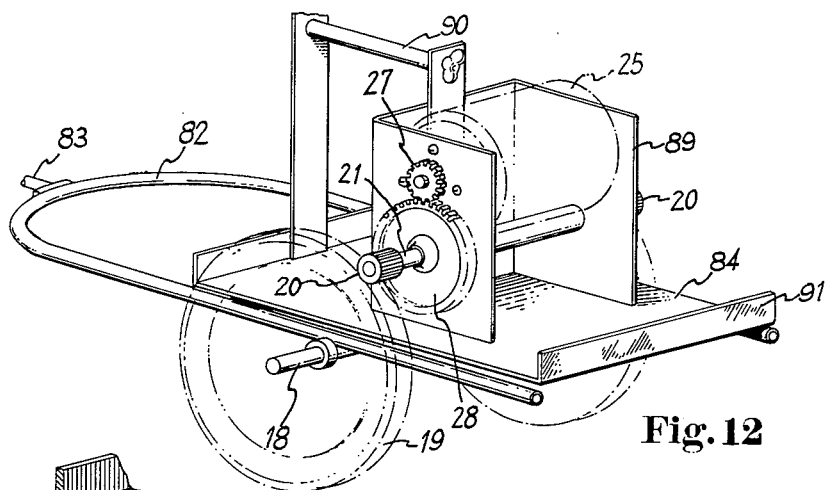
FIGURE 12 is a perspective view of a third embodiment of the invention.
Figure 13:
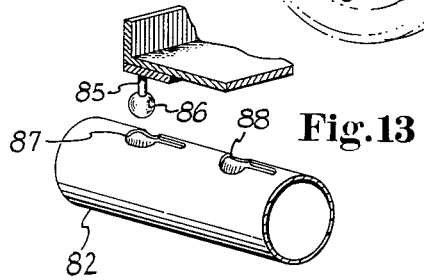
FIGURE 13 is an enlarged fragmentary perspective view of the manner in which the base plate is movably mounted to the wheel supporting frame.

Referring first to FIGURE 1 of the drawings, a conventional golf bag cart is indicated at 1, such cart generally comprising an essentially vertically disposed frame member or post 2 having bag supporting brackets 3 and 4 at its lower and upper ends, respectively. The frame member 2 is supported by a pair of spaced apart wheels 5 rotatably mounted on the free ends of collapsible leg members 6 pivotally connected to the frame member 2 by suitable bracket means 7. Adjacent its upper end, the post 2 mounts an elongated handle 8 pivotally connected to the post by means of bracket 9; and the position of the handle may be set by means of the adjustment nut 10. In the embodiment illustrated, a shaft 11 is also operatively connected to the handle 8, the shaft acting through slidable coupling 12 and links 13 to retract legs 6 upon downward movement of the handle 8. It is to be understood that the construction just described is exemplary of one form of collapsible golf cart and as such does not constitute a limitation upon the instant invention.

The power unit is shown generally at 14, and it will be noted that the unit is of a size to fit between the wheels 5 of the cart, the unit being pivotally connected to the cart by means of a clevis pin 15 received in an eye pin 16 secured to the frame member or post 2 of the cart adjacent its lower end. The power unit is thus operatively connected to the golf cart and yet can be readily detached simply by withdrawing the clevis pin from the eye pin.

Referring now to FIGURE 3 of the drawings, the power unit comprises a U-shaped base frame 17, preferably formed from a length of aluminum tubing, the base of the frame projecting forwardly and mounting the clevis pin 15 in the manner illustrated. At its opposite end, the base frame mounts a transversely disposed axle 18 which may be fixedly secured to the base frame, as by means of bolts 20. It will be understood, of course, that the opposite ends of the axle 18 will project outwardly beyond the sides of the frame 17 so as to rotatably mount the traction wheels 19.

The traction wheels 19 are adapted to be driven by a pair of drive rollers 20 secured to the opposite ends of a drive shaft 21 rotatably journaled in bearings 22 mounted on the side plates 23 forming a part of a generally U-shaped motor mount or housing 24. The drive motor 25 extends between the side plates 23 and is supported thereby, the rotor shaft 26 of the motor projecting through one of the side plates and mounting a gear 27 in meshing engagement with a gear 28 mounted on the drive shaft 21. The gears 27 and 28 will be so chosen as to provide the desired reduction in speed between the rotor shaft 26 and the drive shaft 21; and in an exemplary embodiment the gear ratio is 4:1. The motor itself may be either single direction or reversing, although as will be pointed out in greater detail hereinafter, the motor mount may be reversible, thereby permitting the power unit to be driven in either direction depending upon whether the user wishes to follow the cart or be followed by it. A fractional horsepower motor has been found to be wholly satisfactory, and in an embodiment of the invention now in use a ⅙ horsepower motor operating at 4600 r.p.m. on 12 volts has been found to be highly satisfactory.

As will be seen in FIGURE 3, each of the side plates 23 of the motor mount is provided with an elongated slot 29 of a size to receive the axle 18; and with reference to FIGURE 5, it will seem that the axle 18 is provided with pairs of spaced apart collars 30, 31 which receive the side plates and hence position the motor housing relative to the traction wheels 19. The length of the slots 29 will be such that the drive rollers 20 will make frictional contact with the peripheries of the traction wheels 19. Thus, while the motor housing 23 is mounted on the axle 18, the weight of the housing is actually borne by the drive shaft 21 and drive rollers 20, which bear against the traction wheels 19.

In order to insure positive driving contact between traction wheels 19 and drive rollers 20, the motor mount 24 is biased downwardly by the weight of the battery 32 which is received by a mounting bracket 33, one end of which is supported by the motor housing 24. Thus, the weight of the battery is utilized to maintain the driving rollers 20 in frictional engagement with the traction wheels 19. In addition, the bracket 33 and the weight of the battery prevent a motor housing 24 from pivoting about the wheel axle 18 due to the torque of drive rollers 20.

Preferably, the battery bracket will comprise a pair of formed wire rods 34 having out-turned ends 35 engaging in openings 36 in the side plates 23. At their opposite ends, the rods are turned downwardly, as at 37, so as to be received in openings in the base end of frame member 17. A plate 38 having its opposite side edges rolled to receive the rods 34 acts to join the rods together into a unitary structure.

The speed of the power unit may be controlled by a rheostat 39 mounted on the handle 8 of the cart; and the rheostat may be conveniently connected to the power unit by means of the two wire electrical cord 40 having a male plug member 41 received in one of a pair of female socket members 42 which may be conveniently mounted on the motor housing 23. The other of the female sockets will receive a male plug 43 connected by a two wire cord 44 to the terminals of batteries 32. As will be evident, the cords 40 and 44 will be connected in series through the female plug; and if desired the circuit may be provided with an on-off switch, or such switch may be incorporated in the rheostat 39. If desired, an ammeter may be included in the circuit to give a visual indication of the condition of the battery.

With the arrangement just described, it will be readily apparent that the power unit may be readily disassembled from the cart simply by removing the male plugs 41 and 43 and then disengaging clevis pin 15 from eye pin 16. The cart, if of the collapsible variety, may then be collapsed and stored—as in the trunk of the user's car. The power unit itself is relatively small and can be easily handled as such by the average man. If, however, the power unit in itself is too heavy for handling by a given person, it too can be readily disassembled by simply disengaging the outwardly projecting ends 35 of the battery bracket from the side plates of the motor housing, whereupon the motor housing may be removed from the base frame. It will also be evident that the position of the motor mounting may be reversed in like manner when it is desired to drive the unit in the opposite direction. In this event, the projecing ends 35 of the battery bracket will be engaged in the openings 36a on the opposite sides of the side plates 23.

In using the cart, I have found that separate brake means are not required in that the motor may be used as an effective brake when the device is moving down hill. However, there may be occasions when the user would wish to manually push the entire assembly, in which event it is undesirable to maintain the drive rollers 20 in contact with the traction wheels. For such purposes, the side plates 23 are preferably fitted with a pair of cams 45, one of which is illustrated in FIGURE 4. As seen therein, the cam is provided with a curved portion 46 adapted, in one position of use, to coincide with the uppermost end of the slot 29. The cam is axially movable relative to the plate 23 by means of elongated slots 47 through which pass pins 48. The arrangement is such that when the cams are moved to one position of use, their lower surfaces 49 will contact axle 18 and maintain the entire housing in an elevated position in which the drive rollers 20 are free from contact with traction wheels 18. In their other position of use, the curved portions 46 will be in alignment with the slot 29 and the housing may move downwardly so that the drive roller will make bearing contact with the friction wheels 19. Thumb nuts 50 may be provided to secure the cams in their desired position of use.

Referring now to FIGURES 6 and 7 of the drawings, I have therein illustrated an alternative embodiment of the invention wherein the base frame and motor mount are joined together into a unitary structure. Thus, the base frame comprises a tray or pan 50a of a size to receive the battery for powering the unit. A tongue 51 projects forwardly from the tray for engagement with a fitting 52 forming a part of the golf bag cart. As before, the tongue 51 may be conveniently pivoted to the fitting 52 by means of a clevis pin or similar detachable connection. As before, the device is provided with an axle 18 mounting a pair of traction wheels 19; but in this instance the axle 18 is received in a pair of U-shaped bracket members 53, 53a lying along the trailing edge of the tray 50 and preferably formed integrally therewith. These brackets function in much the same manner as the slots 29 of the preceding embodiment and permit both the base frame and the motor mount to float relative to the axle 18. The motor mount 54 comprises a pair of side plates 55 and 56 joined together by a connecting plate 57 which, in turn, is secured to the centrally disposed vertically extending battery clamp 58 projecting upwardly from the tray 50a adjacent the trailing edge thereof; and a coacting battery clamp 59 projects upwardly from adjacent the forward edge of the battery tray, in the manner illustrated. If desired, the clamp members 58 and 59 may comprise a unitary structure of generally U-shaped configuration between which the battery is secured, as by means of a pin or bolt 60.

As in the preceding embodiment, the motor mount 54 mounts the drive motor 25, the drive shaft 21, which mounts the drive rollers 20, together with the drive gears 27 and 28. It will be evident that the drive rollers 20 will bear against the traction wheels 19 and that the weight of the entire frame assembly, including the drive unit and battery, will act to maintain the drive rollers in contact with the traction wheels.

In order to prevent the axle 18 from becoming disengaged from the U-shaped brackets 53, 53a the tongue 51 is preferably mounted for limited axial movement relative to the battery tray 50a from a position wherein one end thereof, indicated at 51a in FIGURE 9, underlies the axle 18 and hence prevents the axle from being withdrawn from within the confines of the U-shaped brackets 53, 53a, to a retracted position in which the end 51a is displaced to permit the axle to be removed. The tongue is provided with a pair of elongated slots 61, 62 through which pass the headed rivets 63 which act to secure the tongue to the battery tray 50a. Upon movement of the tongue in a rearward direction, the end 51a thereof will underlie the axle 18 and hence prevent it from being removed from the brackets 53, 53a; whereas when the tongue is moved forwardly, the axle will be freed for removal, as illustrated in dotted lines in FIGURE 9. The tongue 51 may be conveniently secured in the rearward or axle engaging position by means of the pin 64 (FIGURES 7 and 8) adapted to pass through mating openings in the tongue 54 and in an interposed spacer 65 which may be fixedly secured to the undersurface of the battery tray 50a. Alternatively, a spring biased pin may be employed if so desired.

Provision is also made to free the drive roller 20 from contact with the traction wheels 19 when it is desired to manually push the golf bag cart and motor unit. In this embodiment, the frame assembly and motor mount is elevated relative to the axle 18 by means of pins or lugs 65a projecting from the axle 18. As will be seen in FIGURE 9, when the pins or lugs 65a are pointed downwardly toward the open ends of the U-shaped brackets 53, 53a, the axle 18 is free to move vertically within the brackets until the drive rollers 20 contact the traction wheels 19. When, however, it is desired to elevate the drive rollers relative to the traction wheels, the axle 18 may be first removed from the brackets 53, 53a, the axle rotated so as to place the pins or lugs 65a uppermost, whereupon when the axle is reinserted in the brackets with the pins 65a uppermost (as illustrated in dotted lines). The pins will then bear against the undersurfaces of the brackets 53, 53a and hence effectively space the entire frame assembly upwardly relative to the axle.

Referring now to FIGURE 10, it has been found preferable when employing the unitary frame and motor mount of FIGURE 6, to proportion the parts so that the drive rollers 20 contact the traction wheels 19 at a point spaced approximately 45° from a vertical line taken through the axle 18. Where the angle is reduced below 45°, it has been found that the drive rollers tend to jump rather than make smooth driving contact with the traction wheels.

FIGURES 6 and 11 also illustrate an alternative form of drive motor control in which the rheostat 66, which controls the current input to drive motor 25, is mounted on the motor mount 54, the shaft 67 of the rheostat being provided with a control wheel 68 and a spring 69 acting to bias the rheostat to the "off" position. Preferably, a Bowden cable 70 will be operatively connected at one end to the control wheel 68 and at its opposite end to a hand control, indicated generally at 71, adapted to be mounted on the hand grip 72 of the handle 8 of the golf bag cart.

Such handle normally terminates in a conventional hand grip formed of rubber or other similar material having a closed free end 73. In accordance with the instant invention, the hand control 71 comprises a U-shaped member having legs 74 and 75 connected together by a base member 76. Each of the leg members has an elongated slot 77 therein which slidably receives the opposite ends of a bar 78 to which the one end of Bowden cable 70 is connected, the end of the Bowden cable preferably passing through an opening 79 in the base member 76. The free end of leg 74 carries a pin 80 adapted to engage in a perforation in the end 73 of hand grip. Conventional hand grips are often provided with such perforations; but in the event such perforation is not present, one may be easily provided by puncturing the ends of the hand grip. The remaining leg 75 is provided with a clamp member 81 adapted to engage about the handle 8, thereby completing the assembly. It will be evident that when the user grips the hand grip 72, the fingers may be employed to raise the bar 78, thereby causing the Bowden cable 70 to turn control wheel 68 against the force of spring 69. When the bar 78 is released, the spring 69 will act to return the rheostat to the "off" position and at the same time, acting through the Bowden cable, return the bar 78 to its lowermost position. It will be evident that the construction of the hand control is such that it may be readily removed from the handle of the golf bag cart when the motor unit is not being used. As before, the motor unit will be provided with a pair of female sockets by means of which the battery may be readily connected to the motor through the rheostat.

Referring now to FIGURES 12 through 16 of the drawings, I have therein illustrated yet another modification of the invention wherein the axle 18 of the traction wheels 19 is fixedly secured to a yoke shaped frame 82 preferably formed from tubular stock and mounting a fitting 83 at its closed end by means of which the frame may be attached to the golf bag cart. In this instance the fitting comprises a small universal joint. A base plate 84 is detachably secured to the frame 82 by means of pins 85 having spherical heads 86 adapted to be selectively engaged in keyhole slots 87, 88 formed in the frame 82. The base plate 84 provides a support for the motor mounting 89 and the battery bracket 90; and as before, the arrangement of the parts is such that the weight of the motor mount and battery will be utilized to press the drive rollers 20 into driving engagement with the traction wheels 19.

Figure 14:
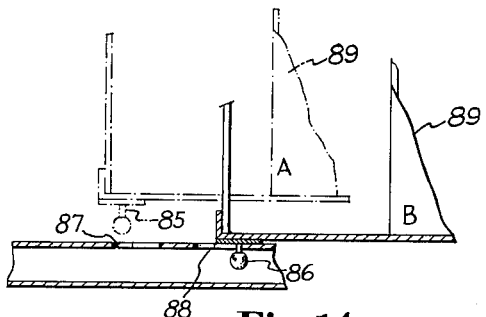
FIGURE 14 is a fragmentary vertical sectional view illustrating the alternate positions of the base plate.
Figure 15:
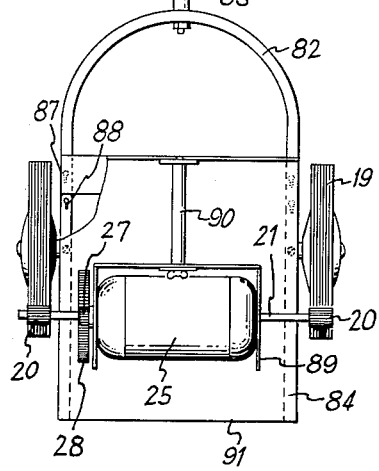
FIGURE 15 is a plan view of the device shown in FIGURE 12.
Figure 16:
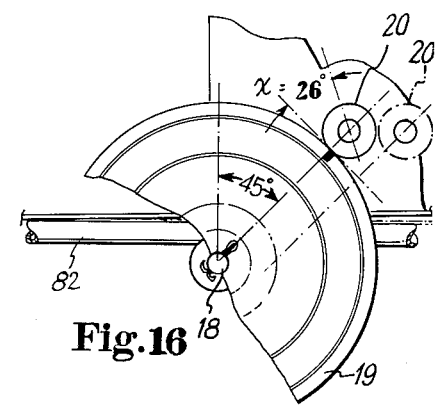
FIGURE 16 is a fragmentary elevational view illustrating the suspension of the base plate from the wheel frame when the drive rollers are in engagement with the traction wheels.

As best seen in FIGURES 14 and 16 the base plate 84 and the parts mounted thereon are selectively movable from a driving position to a non-driving position, depending upon whether the pins 85 are engaged in the sets of keyhole slots 87 or in the slots 88. As illustrated in FIGURE 16, when the pins 85 are engaged in the slot 87, the traction rollers 20 will contact the traction wheels and, as illustrated, the base plate will be slightly elevated relative to the frame 82 so that the weight of the motor unit and battery will be transmitted in part at least through the drive rollers 20 to the traction wheel. When the base plate is displaced rearwardly, i.e. the pins 85 engaged in the slots 88, the rollers 20 will occupy the position illustrated by dotted lines in FIGURE 16 and the base plate will rest on the frame 82. In this inoperative position the user may manually wheel the unit about without the resistance of the drive rollers bearing against the traction wheels.

While in this embodiment of the invention the motor unit is not separable from the battery, the parts supported on the base plate 84 may be readily separated from the traction wheels and frame for separate handling and storage. As in the case of the embodiment of the invention illustrated in FIGURE 6 of the drawings, I have found that maximum driving efficiency is obtained where the proportioning of the parts is such that the drive rollers 20 contact the traction wheels at points spaced approximately 45° from a vertical line taken through the axle 18. In addition, with the points of contact of the pins 85 with the frame 82 as a pivot point, maximum driving efficiency is obtained where the angle X equals 26°, the angle X being the angle at which the tangent of the traction wheel 19 at its point of contact with the drive roller 20 intersects a line passing through the axis of rotation of the drive roller 20 and disposed at right angles to a line extending between the axis of rotation of the drive roller and the point of connection of the base plate 84 to the frame 82, i.e. the point at which the pin 85 engages slot 87.

In the embodiment of the invention just described, it will be noted that the base plate 84 extends rearwardly beyond the motor mount 89 and terminates in an upturned flange 91. This arrangement has been found to be particularly desirable where the motor mounting and battery are to be enclosed in a housing, the base plate providing a convenient medium for the mounting of such housing.

Additional modifications may, of course, be made in my invention without departing from its spirit and purpose. For example, the various embodiments may be provided with a reversible motor, in which event the wiring of the controls will be modified to incorporate a reversing circuit. It will also be evident that the assemblies may be provided with a cover or housing to conceal the operating components and frame members.

Having, however, described my invention in certain exemplary embodiments, what I desire to secure and protect by Letters Patent is:

1. A self-contained power unit for a golf bag cart consisting essentially of a supporting frame and a motor mounting unit overlying said supporting frame; said supporting frame having a forwardly projecting portion terminating at its free forward end in means for pivotally attaching said unit to a golf bag cart, said last named means comprising a swivel joint making single point contact with the golf bag cart, whereby said power unit may follow the contour of the ground independently of the golf bag cart, a transversely disposed axle secured to said supporting frame toward the rearmost end thereof, said axle projecting outwardly beyond the opposite sides of said frame, and a pair of traction wheels mounted on the opposite ends of said axle to the outside of said frame; said motor mounting unit overlying said frame and said axle and lying between said traction wheels, said motor mounting unit comprising bracket means mounting a transversely disposed drive shaft having rollers at the opposite ends thereof positioned for contact with the peripheries of said traction wheels, a drive motor, and means operatively connecting said drive motor to said drive shaft, means operatively connecting said motor mounting unit to said supporting frame with said motor mounting unit free for limited movement relative to said traction wheels, said motor mounting units having an operative position in which said drive rollers contact the peripheries of said traction wheels and are maintained in driving contact therewith by the weight of said motor mounting unit, and means for effecting relative movement between said motor mounting unit and said traction wheels, whereby said drive rollers may be removed from contact with said traction wheels.

2. A power unit for a golf bag cart consisting essentially of a supporting frame and a motor mounting unit connected to said supporting frame; said supporting frame having a forwarding projecting portion terminating at its free forward end in means for pivotally attaching said unit to a golf bag cart, said last named means comprising a swivel joint making single point contact with the golf bag cart, whereby said power unit may follow the contour of the ground independently of the golf bag cart, a transversely disposed axle secured to said frame toward the rearmost end thereof, said axle projecting outwardly beyond the opposite sides of said frame, and a pair of traction wheels mounted on the opposite ends of said axle beyond the sides of said frame; said motor mounting unit overlying said frame and said axle and lying between said traction wheels, said motor mounting unit comprising bracket means mounting a transversely disposed drive shaft having drive rollers at the opposite ends thereof for contact with the peripheries of said traction wheels, a drive motor, means operatively connecting said drive motor to said drive shaft, means detachably securing said motor mounting unit to said frame with said motor mounting unit free for limited movement relative to said traction wheels, said motor mounting unit having an operative position in which said drive rollers contact the peripheries of said traction wheels at an angle at substantially 45° from a vertical plane extending through the axis of rotation of said traction wheels and are maintained in driving contact therewith by the weight of said motor mounting unit, and means for effecting relative movement between said motor mounting unit and said traction wheels, whereby said drive rollers are removed from driving contact with said traction wheels.

3. The power unit claimed in claim 2 wherein said motor mounting unit includes a base plate mounting said bracket means, and wherein the means operatively connecting said motor mounting unit to said frame comprises attachment means on the leading edge of said base plate which pivotally connect said base plate to said frame at points spaced forwardly of said axle.

4. The power unit claimed in claim 3 wherein the angle at which the tangent of each of said traction wheels at its point of contact with the coacting drive roller intersects a line passing through the axis of rotation of the said drive roller and disposed at right angles to a line extending between the axis of rotation of the drive roller and the said point of connection of said base plate to said frame is substantially 26°.

5. In a self-contained power unit for a golf bag cart, a supporting frame and a motor mounting unit detachably connected to said supporting frame; said supporting frame having a forwardly projecting portion terminating at its free forward end in attachment means adapted to make single point contact with a golf bag cart, whereby said power unit may follow the contour of the ground independently of the golf bag cart to which it is attached, a transversely disposed axle secured to said frame toward the rearmost end thereof, said axle projecting outwardly beyond the opposite sides of said frame, and a pair of traction wheels mounted on the opposite ends of said axle; said detachable motor mounting unit comprising a base plate positioned between said traction wheels and overlying said supporting frame and said axle, bracket means on said base plate mounting a drive shaft having drive rollers at the opposite ends thereof positioned for contact with said traction wheels, a drive motor also mounted on said base plate and operatively connected to said drive shaft, means detachably and pivotally connecting the leading edge only of said base plate to said frame at points on said frame along a line spaced forwardly of and parallel to said axle, said drive shaft lying rearwardly of and parallel to said axle and positioned so that said drive rollers will make contact with said traction wheels at an angle of substantially 45° from a vertical plane extending through the axis of rotation of said traction wheels, said base plate being otherwise free from contact with said supporting frame, whereby the weight of said base plate and the parts mounted thereon is utilized to bias said drive rollers into driving contact with said traction wheels.

6. The power unit claimed in claim 5 wherein the angle at which the tangent of each of said drive wheels at its point of contact with the coacting drive roller intersects a line passing through the axis of rotation of said drive rollers and disposed at right angles to a line extending between the axis of rotation of the said drive roller and one of the said points of connection of said base plate to said frame, is on the order of 26°.

7. The power unit claimed in claim 6 wherein said base plate is displaceable rearwardly with respect to said traction wheels, whereby to free said drive rollers from contact with said traction wheels.

8. A self-contained power unit for a golf bag cart consisting essentially of a supporting frame and a motor mounting unit overlying said supporting frame; said supporting frame having a forwardly projecting portion terminating at its free forward end in means for pivotally attaching said unit to a golf bag cart, said last named means comprising a swivel joint making single point contact with the golf bag cart, whereby said power unit may follow the contour of the ground independently of the golf bag cart, a transversely disposed axle secured to said supporting frame toward the rearmost end thereof, said axle projecting outwardly beyond the opposite sides of said frame, and a pair of traction wheels mounted on the opposite ends of said axle to the outside of said frame; said motor mounting unit overlying said frame and said axle and lying between said traction wheels, said motor mounting unit comprising an inverted generally U-shaped housing having opposing side walls mounting a transversely disposed drive shaft having rollers at the opposite ends thereof positioned for contact with the peripheries of said traction wheels, a drive motor, and means operatively connecting said drive motor to said drive shaft, a battery support operatively connecting said motor mounting unit to said supporting frame with said motor mounting unit free for limited movement relative to said traction wheels, said motor mounting unit having an operative position in which said drive rollers contact the peripheries of said traction wheels and are maintained in driving contact therewith by the weight of said motor mounting unit, and means for effecting relative movement between said motor mounting unit and said traction wheels, whereby said drive rollers may be removed from contact with said traction wheels.

9. The drive unit claimed in claim 8 wherein the means for effecting relative movement between said motor mounting unit and said traction wheels comprises elongated slots extending upwardly from the free ends of the opposing side walls of said U-shaped housing, spaced apart pairs of collars mounted on said axle and positioned to receive the elongated slots in said motor mount therebetween, and cam means connected to the opposing side walls of said U-shaped housing to raise and lower said motor mounting unit relative to said axle, whereby to raise and lower said drive rollers into and out of contact with said traction wheels.

10. In a self-contained portable power unit for a golf bag cart, a U-shaped frame, an axle fixedly secured to said U-shaped frame and mounting a pair of traction wheels, a motor mount positioned between said traction wheels and overlying said axle, said motor mount including an electric motor operatively connected to a drive shaft having drive rollers positioned for contact with said traction wheels, said motor mount being free for limited vertical movement relative to said traction wheels, whereby the weight of said motor mount is utilized to bias said drive rollers into driving engagement with said traction wheels, said drive rollers contacting the peripheries of said traction wheels at an angle of substantially 45° from a vertical plane extending through the axis of rotation of said traction wheels, said motor mount being secured to a base plate connected at one end only to said U-shaped frame, said U-shaped frame having spaced apart sets of slots therein, said base plate having depending pins selectively engageable in said sets of slots, whereby said motor mount may be displaced relative to said traction wheels.

References Cited by the Examiner

UNITED STATES PATENTS

| | | | |
|---|---|---|---|
| 1,213,260 | 1/17 | Rendle | 180—19 X |
| 2,298,054 | 10/42 | Howell | 180—74 |
| 2,578,886 | 12/51 | Isherwood et al. | 180—74 X |
| 2,686,571 | 8/54 | Horste | 180—74 |
| 2,695,071 | 11/54 | Hupp | 180—19 |
| 2,812,824 | 11/57 | Adams. | |
| 2,949,972 | 8/60 | Wirkkala | 180—19 |
| 3,059,713 | 10/62 | Beggs | 180—19 X |
| 3,087,562 | 4/63 | Harks | 180—19 X |
| 3,123,173 | 3/64 | Jacobs | 180—74 |

A. HARRY LEVY, *Primary Examiner.*